United States Patent [19]

D'Alelio

[11] B 4,118,377

[45] Oct. 3, 1978

[54] POLYMERIZING BIS-MALEIMIDES

[75] Inventor: Gaetano F. D'Alelio, South Bend, Ind.

[73] Assignee: University of Notre Dame du Lac, Notre Dame, Ind.

[21] Appl. No.: 497,490

[22] Filed: Aug. 14, 1974

[44] Published under second Trial Voluntary Protest Program on Mar. 23, 1976 as document No. B 497,490

Related U.S. Application Data

[63] Continuation-in-part of Ser. No. 363,799, May 25, 1973, Pat. No. 3,890,272.

[51] Int. Cl.² ............................................. C08G 73/12
[52] U.S. Cl. ..................................... 526/236; 526/258; 526/270; 526/89; 526/234; 526/256; 526/262
[58] Field of Search ................. 526/258; 260/78 UA, 260/47 UA, 47 CZ, 47 CP, 65, 326 R, 326 S, 326 NS, 329 AM, 333, 79.7, 88.5 A, 88.3 A

[56] References Cited

U.S. PATENT DOCUMENTS

| | | | |
|---|---|---|---|
| 3,576,691 | 4/1971 | Meyers | 156/309 |
| 3,671,490 | 6/1972 | Bargain | 260/47 |
| 3,708,459 | 1/1973 | Lubowitz | 260/65 |
| 3,748,310 | 7/1973 | Burns et al. | 260/78.4 |
| 3,748,311 | 7/1973 | Burns et al. | 260/78.4 |
| 3,748,312 | 7/1973 | Burns et al. | 260/78 A |
| 3,803,081 | 4/1974 | Lubowitz | 260/37 N |

OTHER PUBLICATIONS

Lubowitz, *New Polyimides Polymers and Composites* Conference on High Temperature Polymers, Reinforcements and Composites, University of Utah, Jun. 8 to 13, 1970.

*Primary Examiner*—Lester L. Lee
*Attorney, Agent, or Firm*—Michael, Best & Friedrich

[57] ABSTRACT

Processes for increasing the molecular weight of bis-maleimides are provided. The bis-maleimides are reacted with certain cyclic dienes to form reversible adducts. These adducts, upon elimination of the cyclic diene, yield an extension of the bis-maleimides to higher molecular weight polymers, ultimately to thermally stable, infusible polymers. The process can be interrupted to yield tractable polymers which are also convertible to cross-linked, infusible products. Modifications of the process include preparing the adducts in the presence of aprotic solvents as well as Bronsted acid salt catalysts, and the isolation of intermediate solid products.

15 Claims, No Drawings

POLYMERIZING BIS-MALEIMIDES

RELATIONSHIP TO RELATED APPLICATIONS

This application is a continuation-in-part of copending U.S. application Ser. No. 363,799, filed May 25, 1973 now U.S. Pat. No. 3,890,272.

BACKGROUND OF THE INVENTION

1. Field of the Invention

This invention relates to processes for preparing polyimides and certain polyimides obtained thereby and more particularly to such processes and polyimides starting from bis-maleimides.

2. Prior Art

The inventor is aware of no prior art where an adduct is made from a pre-synthesized, completely cyclized bis-maleimide of the formula:

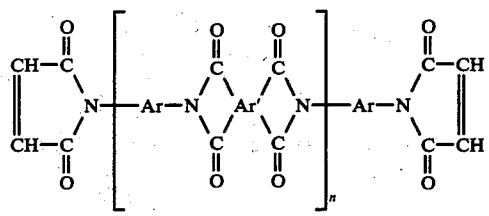

wherein
Ar is a divalent aromatic organic radical,
Ar' is a tetravalent aromatic organic radical, the four carbonyl groups being attached directly to separate carbon atoms and each pair of carbonyl groups being attached to adjacent carbon atoms in the Ar' radical, and
n is 0 or a positive integer of 1 to 20, and a cyclic diene of the formula:

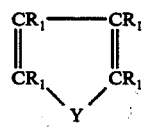

wherein
Y is —O—, —S—, or

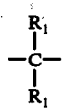

and
each $R_1$ is hydrogen or an aliphatic hydrocarbon of 1 to 4 carbon atoms with the proviso that the sum of the $R_1$ is no greater than 4 carbon atoms,
and then reversing the adduct to increase the molecular weight of the product. The only prior art known to the inventor are polyimides whose end-groups are derived from the endomethylene phthalic anhydrides. These prior art adducts are cured directly, presumably by the formation of terminal maleimide groups. Such polyimides are shown in U.S. Pat. No. 3,738,969, issued June 12, 1973, to Fred F. Holub and Denis R. Pauze.

Other prior art references of interest are U.S. Pat. Nos. 3,748,310 and 3,748,311, all issued July 24, 1973, to Eugene A. Barns and Robert J. Jones; U.S. Pat. No. 3,632,428, issued Jan. 4, 1972, to Hyman R. Lubowitz et al; U.S. Pat. No. 3,699,074, issued Oct. 17, 1972, to Hyman R. Lubowitz et al and U.S. Pat. No. 3,763,101, issued Oct. 2, 1973 to Robert J. Jones and Eugene A. Burns.

There appears to be no prior art teaching adducts from cyclic pentadienes or cyclic dienes, containing oxygen or sulfur as the hetero atoms in the five membered ring, useful for the purposes of this invention.

SUMMARY OF THE INVENTION

According to the present invention there is provided a process of increasing the molecular weight of the bis-maleimide by forming an adduct with a cyclic diene and thereafter removing a sufficient portion of the cyclic diene to yield at least a dimer of the bis-maleimide.

There is also provided an adduct of 1 to 2 moles of the above cyclic diene where oxygen or sulfur is in the hetero position with 1 mole of the above bis-maleimide.

DETAILED DESCRIPTION OF THE INVENTION

Bis-maleimides are increased in molecular weight by forming an adduct with certain cyclic 1,3-dienes and thereafter eliminating the cyclic 1,3-dienes. The cyclic dienes useful in this invention have the formula:

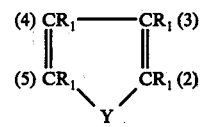

wherein
Y is —O—, —S—, or

and
each $R_1$ is hydrogen or an aliphatic hydrocarbon of 1 to 4 carbon atoms with the proviso that the sum of the $R_1$ is no greater than 4 carbon atoms.
Preferably, the cyclic dienes are those in which each $R_1$ is hydrogen and Y is —O—, and their boiling points under standard conditions are in the range of about 30°–120° C. The simplest and most preferred of these are furan annd cyclopentadiene, i.e., cyclic dienes of the formulas:

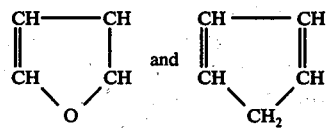

Cyclic dienes suitable for use in the invention are shown in the following Table I:

TABLE I

| $R_1$ - Position | | | | | |
|---|---|---|---|---|---|
| (2) | (3) | (4) | (5) | Y | B.P. ° C. |
| H | H | H | H | O | 32 |
| $CH_3$ | H | H | $CH_3$ | O | 92 |
| $C_2H_5$ | H | H | $C_2H_5$ | O | 93 |
| H | H | H | H | CH | 41–42 |
| $CH_3$ | H | H | H | O | 65–66 |
| H | $CH_3$ | H | H | O | 65–66 |

TABLE I-continued

| R₁ - Position | | | | | |
|---|---|---|---|---|---|
| (2) | (3) | (4) | (5) | Y | B.P. ° C. |
| H | C₃H₇ | H | H | O | |
| H | H | H | C₃H₇ | O | |
| C₄H₉ | H | H | H | O | |
| H | H | H C₄H₉ | | O | |
| CH₃ | H | C₃H₇ | H | O | |
| CH₃ | CH₃ | CH₃ | CH₃ | O | |
| H | CH₃ | H | H | S | |
| H | C₃H₇ | H | H | S | |
| H | H | H | C₃H₇ | S | |
| C₄H₉ | H | H | H | S | |
| H | H | H C₄H₉ | | S | |
| CH₃ | H | C₃H₇ | H | S | |
| CH₃ | CH₃ | CH₃ | CH₃ | S | |
| H | H | H | H | S | 84 |

Bis-maleimides are prepared, as is known in the art, by the reaction of maleic anhydride and a diamine. The bis-maleimides used in the present process can be prepared as known in the art or by the azeotroping process described in my copending application Ser. No. 363,800 filed May 25, 1973. The bis-maleimides useful in the present invention have the structural formula

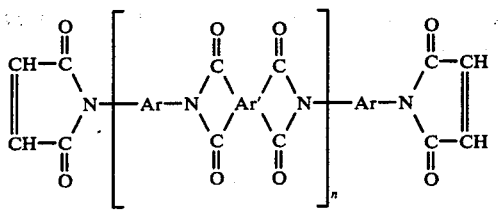

wherein
Ar is a divalent aromatic organic radical,
Ar' is a tetravalent aromatic organic radical, the four carbonyl groups being attached directly to separate carbon atoms and each pair of carbonyl groups being attached to adjacent carbon atoms in the Ar' radical, and
n is 0 or a positive integer of 1 to 20.

The divalent aromatic radical Ar and the tetravalent aromatic radical Ar' can be any of the radicals described in polyimide patents known in the art that are derived from an aromatic diamine and an aromatic dianhydride respectively. Ar' preferably contains at least one ring of six carbon atoms characterized by benzenoid unsaturation. Any of the aromatic tetracarboxylic acid dianhydrides known in the prior art can be used to provide Ar'. Among the useful dianhydrides are 3,3',4,4'-benzophenonetetracarboxylic acid dianhydride, pyromellitic dianhydride, 2,3,6,7-naphthalene tetracarboxylic acid dianhydride, 3,3',4,4'-diphenyl tetracarboxylic acid dianhydride, 1,2,5,6-naphthalene tetracarboxylic acid dianhydride, 2,2',3,3'-diphenyl tetracarboxylic acid dianhydride, 2,2-bis-(3,4-dicarboxyphenyl)propane dianhydride, 3,4,9,10-perylene tetracarboxylic acid dianhydride, bis(3,4-dicarboxyphenyl)ether dianhydride, naphthalene-1,2,4,5-tetracarboxylic acid dianhydride, naphthalene-1,4,5,8-tetracarboxylic acid dianhydride, decahydronaphthalene-1,4,5,8-tetracarboxylic acid dianhydride, 4,8-dimethyl-1,2,3,5,6,7-hexahydronaphthalene-1,2,5,6-tetracarboxylic acid dianhydride, 2,6-dichloronaphthalene-1,4,5,8-tetracarboxylic acid dianhydride, 2,7-dichloronaphthalene-1,4,5,8tetracarboxylic acid dianhydride, 2,3,6,7-tetrachloronaphthalene-1,4,5,8-tetracarboxylic acid dianhydride, phenanthrene-1,8,9,10-tetracarboxylic acid dianhydride, cyclopentane-1,2,3,4-tetracarboxylic acid dianhydride, pyrrolidine-2,3,4,5-tetracarboxylic acid dianhydride, pyrazine-2,3,5,6-tetracarboxylic acid dianhydride, 2,2-bis(2,3-dicarboxyphenyl)propane dianhydride, 1,1-bis(2,3-dicarboxyphenyl)ethane dianhydride, 1,1-bis-(3,4-dicarboxyphenyl)ethane dianhydride, bis(2,3-dicarboxyphenyl)methane dianhydride, bis(3,4-dicarboxyphenyl)methane dianhydride, bis(3,4-dicarboxyphenyl)sulfone dianhydride, benzene-1,2,3,4-tetracarboxylic acid dianhydride and thiophene-2,3,4,5-tetracarboxylic acid dianhydride. Preferred Ar' radicals are

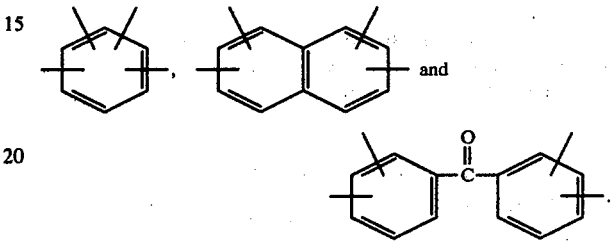

Ar is a divalent benzenoid radical selected from the group consisting of

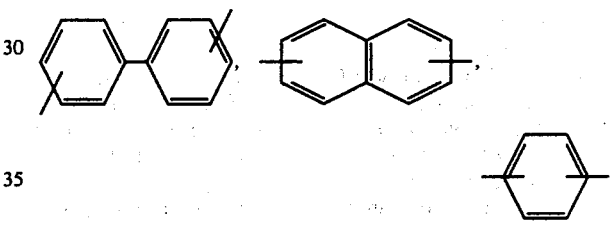

and multiples thereof connected to each other by R, for example,

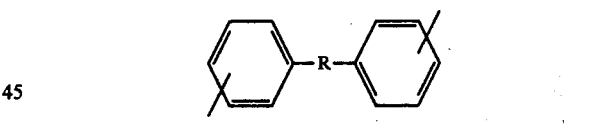

wherein R is an alkylene chain of 1-3 carbon atoms, —CH=CH—,

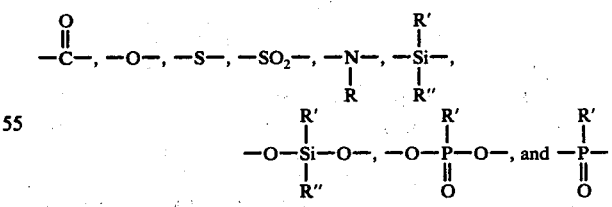

wherein R' and R" are each selected from the group consisting of alkyl and aryl of 1 to 6 carbon atoms. Ar is preferably

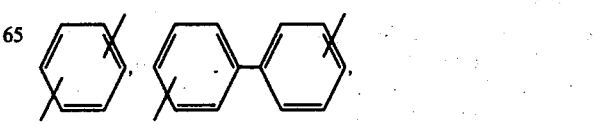

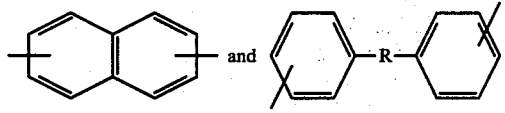

where R is

—O—, —S—, —CH=CH— and —SO$_2$—.

Examples of aromatic diamines which are suitable to provide Ar are 4,4'-diaminodiphenyl propane, 4,4'-diamino-diphenyl methane, benzidine, 3,3'-dichlorobenzidene, 4,4'-diamino-diphenyl sulfide, 3,3'-diaminodiphenyl sulfone, 4,4'-diamino-diphenyl sulfone, 4,4'-diaminodiphenyl ether, 1,5-diamino naphthalene, 4,4'-diaminodiphenyl diethylsilane, 4,4'-diamino-diphenyl diphenylsilane, 4,4'-diamino-diphenyl ethyl phosphine oxide, 4,4'-diaminodiphenyl phenyl phosphine oxide, 4,4'-diamino-diphenyl N-methyl amine, 4,4'-diaminodiphenyl N-phenyl amine and mixtures thereof. 3,3'-dimethyl-4,4'-diaminodiphenylmethane, 3,3'-diethyl-4,4'-diaminodiphenylmethane, 3,3'-dimethoxy-4,4'-diaminodiphenylmethane, 3,3'-diethoxy-4,4'-diaminodiphenylmethane, 3,3'-dichloro-4,4',4,4'-diaminodiphenylmethane, 3,3'-dibromo-4,4'-diaminodiphenylmethane, 3,3'-dicarboxy-4,4'-diaminophenylmethane, 3,3'-dihydroxy-4,4'-diaminophenylmethane, 3,3'-disulpho-4,4'-diaminodiphenylmethane, 3,3'-dimethyl-4,4'-diaminodiphenylether, 3,3'-diethyl-4,4'-diaminodiphenylether, 3,3'-dimethoxy-4,4'-diaminodiphenylether, 3,3'-diethoxy-4,4'-diaminodiphenylether, 3,3'-dichloro-4,4'-diaminodiphenylether, 3,3'-dibromo-4,4'diamino diphenylether, 3,3'-dicarboxy-4,4'-diaminodiphenylether, 3,3'-dihydroxy-4,4'-diaminodiphenylether, 3,3'-disulfo-4,4'-diaminodiphenylether, 3,3'-dimethyl-4,4'-diaminodiphenylsulfide, 3,3'-diethyl-4,4'-diaminodiphenylsulfide, 3,3'-dimethoxy-4,4'-diaminodiphenylsulfide, 3,3'-diethoxy-4,4'-diaminodiphenylsulfide, 3,3'-dichloro-4,4'-diaminodiphenylsulfide, 3,3'-dibromo-4,4'-diaminodiphenylsulfide, 3,3'-dicarboxyl-4,4'-diaminodiphenylsulfide, 3,3'-dihydroxy-4,4'-diaminodiphenylsulfide, 3,3'-disulfo-4,4'-diaminodiphenylsulfide, 3,3'-dimethyl-4,4'-diaminodiphenylsulfone, 3,3'-diethoxy-4,4'-diaminodiphenylsulfone, 3,3'-dichloro-4,4'-diaminodiphenylsulfone, 3,3'-dicarboxy-4,4'-diaminodiphenylsulfone, 3,3'-dihydroxy-4,4'-diaminodiphenylsulfone, 3,3'-disulfo-4,4'-diaminodiphenylsulfone, 3,3'-diethyl-4,4'-diaminodiphenylpropane, 3,3'dimethoxy-4,4'-diaminodiphenylpropane, 3,3'-dibromo-4,4'-diaminodiphenyl-propane, 3,3'-dichloro-4,4'-diaminodiphenylpropane, 3,3'-dicarboxy-4,4'-diaminodiphenylpropane, 3,3'-dihydroxy-4,4'-diaminodiphenylpropane, 3,3'-disulfo-4,4'-diaminodiphenylpropane, 3,3'-dimethyl-4,4'diaminobenzophenone, 3,3'-dimethoxy-4,4'-diaminobenzophenone, 3,3'-dichloro-4,4'-diaminobenzophenone, 3,3'-dibromo-4,4'-diaminobenzo-phenone, 3,3'-dicarboxy-4,4'-diaminobenzophenone, 3,3'-dihydroxy-4,4'-diaminobenzophenone, 3,3'-disulpho-diaminobenzophenone, 3,3'-diaminodiphenylmethane, 3,3'-diaminodiphenylether, 3,3'-diaminodiphenylsulfide, 3,3'-diaminodiphenylsulfone, 3,3'-diaminodiphenylpropane, 3,3'-diaminobenzophenone, 2,4-diaminotoluene, 2,6-diaminotoluene, 1-isopropyl-2,4-phenylenediamine, 2,4-diaminoanisole, 2,4-diaminomonochlorobenzene, 2,4-diaminofluorobenzene, 2,4-diaminobenzoic acid, 2,4-diaminophenol, and 2,4-diamino-benzenesulfonic acid, and phenylene diamines.

The process of the invention can be carried out in the absence of solvents in those cases in which the bis-maleimides are soluble in the cyclic dienes described above or the cyclic dienes are soluble in the bis-maleimides. In other cases where the bis-maleimides are insoluble or of limited solubility, the process is performed in an aprotic solvent having a dielectric constant between 35 and 45. Representative aprotic compounds are N,N-dimethylformamide, N,N-diethylformamide, N,N-dimethylmethoxyacetamide, N-methyl caprolactam, caprolactam, N,N-dimethylacetamide, N,N-diethylacetamide, dimethyl sulfoxide, N-methyl-α-pyrrolidone, tetramethylurea, hexamethylphosphoramide, tetramethylene sulfone, N,N,N',N'-tetramethyl-α-ethylmalonamide, N,N,N',N'-tetramethylglutaramide, N,N,N',N'-tetramethylsuccinamide, thiobis (N,N-dimethylacetamide), bis(N,N-dimethylcarbamylmethyl)-ether, N,N,N',N'-tetramethylfuraramide, methylsuccinonitrile, N,N-dimethylcyanoacetamide, N,N-dimethyl-β-cyano-propionamide, N-formyl-piperidine and butyrolactone, etc.

Of the solvents, dimethylacetamide is most preferred. Other preferred solvents are dioxane, dimethylformamide, N-methyl pyrrolidone, dimethyl sulfoxide, butyrolactone and caprolactam.

Also, advantageously in some cases, the process is performed in the presence of a catalytic amount of an alkali metal salt of a Bronsted acid, said alkali salt of a Bronsted acid selected from the group consisting of an alkali metal salt of an organic Bronsted acid having a pk$_a$ in the range of about 4 to 6, an alkali metal cyanide and an alkali metal carbonate.

In carrying out the process, the bis-maleimide is preferably dissolved in a solvent and heated in the presence of a catalytic amount (usually 0.01 to 5% by weight of the bis-maleimide and preferably about 1 to 5%) of the alkali metal salt of a Bronsted acid. The Bronsted acid salt catalyst used is an alkali metal (Na, K and Li) salt of an organic Bronsted acid having a pk$_a$ in the range of about 4 to 6, an alkali metal (Na, K and Li) cyanide or an alkali metal (Na, K and Li) carbonate. A preferred catalyst is a neutralized alkali metal salt of a monocarboxylic acid or dicarboxylic acid.

The use of the alkali metal salt catalyst is advantageous in that it allows the B-staging to proceed at lower temperatures than when it is not used. The catalyst is most preferably an alkali metal (usually sodium or potassium) salt of a monocarboxylic acid or dicarboxylic acid having 2 to 12 carbon atoms, such as acetic acid, propionic acid and butyric acid. While the higher molecular weight monocarboxylic acids are not preferred, they are useful because of their usual solubility in organic solvents. Other useful catalysts are alkali neutralized dicarboxylic acids such as oxalic acid, malonic acid, succinic acid, glutaric acid, adipic acid, maleic acid, fumaric acid, itaconic acid, glutaconic acid. Sodium acetate and disodium maleate are preferred catalysts.

Representative organic Bronsted acids and their appropriate pk$_a$ values are as follows:

| Organic Acid | $pk_a$ |
| --- | --- |
| Acetic | 4.75 |
| Propionic | 4.87 |
| Butyric | 4.81 |
| i-Butyric | 4.84 |
| Heptanoic | 4.89 |
| Glutaric (2) | 5.41 |
| Fumaric | 4.44 |
| Benzoic | 4.19 |
| Succinic (1) | 4.16 |
| Ethylbenzoic | 4.35 |
| Ethylphenylacetic | 4.37 |
| Adipic | 4.43 |
| Ascorbic | 4.10 |
| Gamma chlorobutyric | 4.00 |
| Maleic (2) | 6.07 |
| Malic (2) | 5.11 |
| m-methyl cinnamic | 4.44 |
| o-phthalic | 5.51 |
| m-phthalic | 4.60 |
| p-phthalic | 4.82 |
| Oxalic | 4.19 |
| Malonic (2) | 5.69 |

The mole ratio of cyclic diene to bis-maleimide is from 1 to 2 moles of cyclic diene to 1 mole of bis-maleimide. This is the chemical ratio; however, large excesses of cyclic diene can be used, e.g., up to 8:1, 100:1, 1000:1 or more as solvent or to more effective control the B-staging.

The temperature for performing the reaction can vary over a wide range and will depend on the particular bis-maleimide, the particular cyclic diene, the presence or absence of aprotic solvents and Bronsted acid salt catalysts, and the specific boiling point of the cyclic diene. In some cases, particularly when the low boiling point cyclic dienes are used, the process can be operated under super atmospheric pressures, e.g., at least 2 atmospheres. In general, the addition of cyclic diene to bis-maleimide is performed at a temperature in the range of 5°–100° C., preferably about 20°–80° C.

The elimination of the cyclic diene from the adduct can also be performed thermally at temperatures ranging from the boiling point of the cyclic diene at atmospheric pressure to sub or super atmospheric pressures, e.g., as low as 1 mm. A temperature in the range of about 30°–120° C. is usually sufficient.

The process is particularly advantageous for the lower monomeric bis-maleimides, e.g., where $n$ is 0, which have poor tractability, i.e., high melting points and low solubility, and normally cannot be used in industrial processes for practical utility. Bis-maleimides when $n$ is 0 include N,N'-p-phenylene-bis-maleimide, N,N'-meta-phenylene-bis-maleimide, N,N'-4,4'-diphenylmethane-bis-maleimide, N,N'-4,4'-diphenylether-bis-maleimide, N,N'-4,4'-diphenylsulphone-bis-maleimide, N,N'-m-xylylene-bis-maleimide, N,N'-4,4'-diphenylcyclohexane-bis-maleimide and a bis-maleimide of the formula:

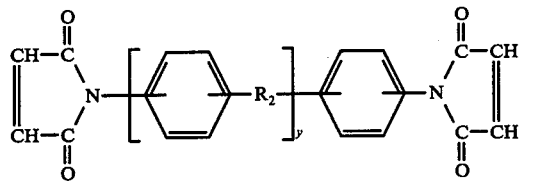

wherein $R_2$ is —$CH_2$—, —O—, or —$SO_2$— and $y$ is a positive integer of 1 to 3.

By the present process, these intractable bis-maleimides are converted to fusible, tractable, soluble intermediates which can be fabricated into products of utility.

For those bis-maleimides where $n$ is 1 to 20, the present process converts the materials into a condensed state or high molecular weight which makes the resulting products particularly useful in the impregnating and laminating arts.

The above-described increase in molecular weight is known in the industry as B-staging, "bodying" or prepolymer formation. It describes an increase in the molecular weight of the starting materials whereby the properties are enhanced to permit practical and useful applications of the product in commerce. When performed in solution, it is obvious that the B-staging process should be such that it can be controlled to a stage short of gelation. It was completely unexpected that it could be controlled by the process of this invention.

The adduct process can also be conducted in the presence of mono-maleimides of the formula

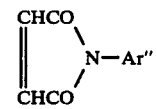

wherein Ar" is an aromatic moiety characterized by benzenoid unsaturation containing six to ten carbon atoms, e.g. phenyl, tolyl, xylyl, naphthyl and halogenated derivatives thereof, e.g. the chlorides, bromides and fluorides to simultaneously copolymerize with the bis-maleimides. The monomaleimides may be used up to 1 mole per mole of bis-maleimides without serious loss to the thermal solubility; and where very high thermal stability is not too critical, the ratio of 3 moles of monomaleimide to bis-maleimide can be used. For most applications the preferred ratio is 0.1 to 5 moles of mono to 1 of bis-maleimide.

Numerous new and useful adducts have accrued to this invention, particularly those adducts of cyclic dienes using oxygen and sulfur as the hetero atoms. These adducts, which can be isolated, are Diels-Alder adducts of $m$ moles of (a) a cyclic diene of the formula:

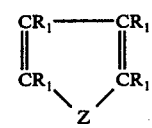

wherein
Z is —O— or —S—,
each $R_1$ is hydrogen or an aliphatic hydrocarbon of 1 to 4 carbon atoms with the proviso that the sum of the $R_1$s is no greater than 4 carbon atoms, and
$m$ is a positive integer of 1 to 2,
with (b) 1 mole of a bis-maleimide of the formula:

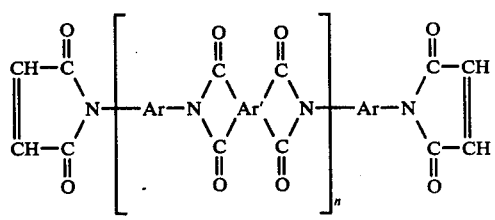

wherein

Ar is a divalent aromatic organic radical,

Ar' is a tetravalent aromatic organic radical, the four carbonyl groups being attached directly to separate carbon atoms and each pair of carbonyl groups being attached to adjacent carbon atoms in the Ar' radical, and $n$ is 0 or a positive integer of 1 to 20.

When the process is carried out in the solvent, including excess cyclic diene as the solvent, the process can be interrupted at any desired increased molecular weight or viscosity from a dimer on up, and for some purposes a solid B-staged polymer can be isolated by use of a precipitating non-solvent for the polymer. Illustrative precipitating liquids, but not limited thereto, are alcohols such as methanol, ethanol, isopropanol, ethylene glycol, propylene glycol; esters such as ethyl formate, ethyl acetate, ethylene glycol diacetate; ethers such as methyl cellosolve, butyl cellosolve, ethyl cellosolve acetate; hydrocarbons such as benzene, toluene, xylene, cyclohexane, cyclohexene; aromatic ethers such as methyl phenyl ether, hydroxy ethyl phenyl ether, and water. Water and methanol are preferred.

B-staged polyimides prepared by this process have many uses.

The compositions of the present invention have application in a wide variety of physical shapes and forms, including the use as films, molding compounds, coatings, etc. The unusual heat stability and resistance to deformation at elevated temperatures in the cured state, makes these compositions especially unique. When used as films or when made into molded products, these polymers, including laminated products prepared therefrom, not only possess excellent physical properties at room temperature but they retain their strength and excellent response to work-loading at elevated temperatures for long periods of time. The fact that they have high decomposition points well above 500° C., and in some instances above 550° C., indicates a wide range of commercial utility for these products. These polymers in particular resist fusion when exposed to temperatures of 410° to 520° C. for extended periods of time while still retaining an exceptionally high proportion of their room temperature physical properties. The ability to make fusible or soluble precursors of the finely cured products makes them especially suitable in the preparation of shaped articles such as films, molded products, etc. whereby using conventional techniques, the mixture of copolymerized ingredients can be converted in situ to the finally cured, infusible and insoluble state.

Films formed from the polymeric compositions of this invention may be used in applications where films have been used previously and in addition films therefrom can be used in applications where films in the past have not been especially suitable. They serve effectively in an extensive variety of wrapping, packaging and bundling applications. Thus, the compositions of the present invention can be used in automobile and aviation applications for decorative and protective purposes, and as high temperature electrical insulation for motor slot liners, in transformers, as dielectric capacitors, as coil and cable wrappings (form wound coil insulation for motors), for packaging items to be exposed to high temperatures or to corrosive atmospheres, in corrosion-resistant pipes and duct work, for containers and container linings, in laminating structures where films of the present composition or where solutions of the claimed compositions of matter are applied to various heat-resistant or other type of materials such as asbestos, mica, glass fiber and the like and superposing the sheets one upon the other and thereafter subjecting them to elevated temperatures and pressures to effect flow and cure of the resinous binder to yield cohesive laminated structures.

Films made from these compositions of matter can serve in printed circuit applications, for instance, as backings by coating the films made from such cured compositions with a thin layer of copper or aluminum either by coating the metal with the curable or heat-convertible compositions herein described and then by heating at elevated temperatures to convert the product to the completely cured state, or by laminating a metal sheet to the cured resinous composition. The circuit design is then covered by a protective coating and the extra metal is etched off followed by washing to prevent further etching. An advantage of making such circuit boards is that the base film is stable to heat so that it can be connected to other components by a dip soldering technique while in contact with the other components without adversely affecting the resinous support base.

Alternatively, solutions of the curable compositions herein disclosed can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoro-ethylene, etc. The use of the curable compositions of the present invention as overcoats on other types of insulation is not precluded.

Applications which recommend these resins include their use as binders for asbestos fibers, carbon fibers, and other fibrous materials in making brake linings. In addition, molding compositions and molded articles may be formed from the polymeric compositions in this invention by incorporating such fillers as asbestos, glass fibers, talc, quartz, powder, wood flour, finely divided carbon, silica, into such compositions prior to molding. Shaped articles are formed under heat, or under heat and pressure in accordance with practices well known in the art. In addition, various heat-resistant pigments and dyes may be incorporated as well as various types of inhibitors depending on the application intended. So-called resistance or semiconducting paints may also be made from the compositions by incorporating in solutions or dispersions of the curable polymeric mixture, controlled amounts of conducting materials such as carbon, silicon carbide, powdered metal, conducting oxides, etc. in order to impart to the cured paint the particular degree of resistance of semiconduction.

Among the specific applications for which the compositions herein defined may be employed include as finishes for the interiors of ovens, clothing driers, as finishes for cooking utensils, muffler liners, liners for high temperature equipment including liners for hot water heaters, as protective coatings for fragile or brittle substrates such as protective coatings for high temperature bulbs, glass equipment, etc., as flame-retardant paints, as belting for use in high temperature conveyors, etc.

The compositions herein defined may suitably be incorporated in other materials to modify the properties of the latter or in turn their properties may be modified by the incorporation of the other material. For example, they may be compounded with substances such as natural or synthetic rubbers; synthetic resins such as phenol-aldehyde resins, urea aldehyde resins, alkyd resins, etc.; cellulosic material such as paper, inorganic and organic esters of cellulose such as cellulose acetate, cellulose ether; such as methyl cellulose, ethyl cellulose, benzyl cellulose, etc. In some instances, plasticizers and other modifying agents may be used in combination therewith to yield products which when applied to a base member and air dried or baked have a high degree of heat-resistance due to the presence of the compositions herein defined.

The invention can be further understood by the following examples in which parts and percentages are by weight unless otherwise indicated.

EXAMPLE 1

B-Staging of N,N'-p-Phenylenedimaleimide

Dioxane recrystallized N,N'-p-phenylenedimaleimide (134 mg, 0.5 m.mole) and furan (136 mg, 2 m.moles), disodium maleate (4 mg) were added to 1.5 ml DMAC in a 10 ml round-bottom flask equipped with a magnetic stirrer, reflux condenser, oil heating bath, inert gas inlet, etc. A nitrogen atmosphere was introduced into the flask and the mixture heated with stirring. A clear, red colored homogeneous solution formed when the bath temperature reached approximately 80° C. The bath temperature was raised to 95° C., yielding a solution of moderate viscous material which did not increase in viscosity or gel when the heating was continued for 2 additional hours. Then, furan (1 m.moles) was allowed to escape from the reaction mixture by removing the condenser, the condenser reinserted and reflux continued for 1 hour yielding a solution of higher viscosity which did not increase in viscosity on further heating. Then, when the condenser was removed again and the remainder of the furan allowed to escape, a gel was obtained which was insoluble in DMAC. After 3 hours of heating and before the remainder of the furan was allowed to escape, a sample of the solution was removed and cooled to room temperature yielding a viscous solution from which a tractable, fusible, curable solid dry powder was isolated by precipitation in water.

In a control experiment, in which the same quantities of reagents were used, except that furan was omitted from the reaction mixture, gellation occurred within one hour of reaction time.

This example illustrates the B-staging of polymaleimides, specifically the dimaleimides, by controlling the polymerization by means of a reversible Diels-Alder Mechanism using as the donor a diene, a donor whose boiling point at 760 mm pressure is less than 120° C.

EXAMPLE 2

Example 1 is repeated, except N,N'-(oxy-di-p-phenylene)-dimaleimide (OPDM) as prepared in Example 1 of my parent application Ser. No. 363,799, filed May 25, 1973, is used in place of N,N'-p-phenylenedimaleimide. An increase in molecular weight is noted.

EXAMPLE 3

Example 1 is repeated using N,N'-[1,3-di-(3-aminophenoxy)benzene] dimaleimide (APDM) prepared as in Example 2 of my aforesaid parent application. An increase in molecular weight is noted.

EXAMPLE 4

N,N'-(sulfonyl-p-phenylene)-dimaleimide (SPDM) is prepared as in Example 3 of my aforesaid parent application. When it is used in Example 1 in place of N,N'-p-phenylene-dimaleimide, an increase in molecular weight is obtained.

EXAMPLE 5

Example 1 is repeated replacing N,N'-p-phenylenedimaleimide with a bis-maleimide of the formula:

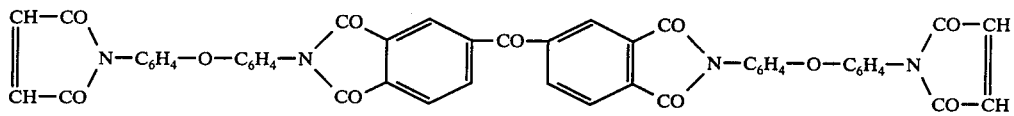

This bis-maleimide (BTMI-1) is prepared as in Example 5 of my aforesaid parent application.

EXAMPLE 6

A bis-maleimide (BTMI-3) prepared as in Example 6 of my aforesaid parent application is used instead of N,N'-p-phenylene dimaleimide with similar results. BTMI-3 has the formula:

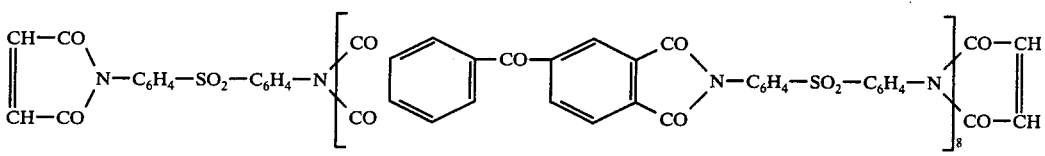

An increase in molecular weight is obtained.

EXAMPLE 7

When thiophene is substituted for furan in Examples 1 to 6, a similar increase in molecular weight is obtained.

EXAMPLE 8

Cyclopentadiene is substituted for furan in Examples 1 to 6. A similar increase in molecular weight is noted.

EXAMPLE 9

When any of the 1 to 4 carbon atom alkyl substituted furans listed in Table I (supra) are used in place of furan in Example 1, an increase in molecular weight is noted.

EXAMPLE 10

When any of the 1 to 4 carbon atom alkyl substituted thiophenes listed in Table I (supra) are used in place of furan in Example 1, an increase in molecular weight is noted.

EXAMPLE 11

In a round bottom flask equipped with condenser, stirrer, heating mantle etc., there is placed 4.5 parts (0.01 mole) of APDM (Example 3), 68 parts (1 mole) of furan and the mixture allowed to stand at ambient temperature for 24 hours. Then the excess furan is slowly distilled from the reaction mixture over a period of 4 hours. During the course of distillation, an increase in viscosity is observed; and, eventually the pot temperature of the residue increases. The resulting viscous mass becomes converted to an insoluble, fusible state at a pot temperature of about 150° C. When the pot temperature is about 180° C., gelation occurs.

EXAMPLE 12

Example 11 is repeated in the presence of 40 mg. of sodium acetate. Gelation is observed to occur in about 1 hour.

EXAMPLE 13

Example 6 of my aforesaid parent application is repeated using, instead of SDA-3,3 an equivalent amount of DAPB-3,3 as prepared in Example 2(a) of my aforesaid parent application. There is obtained a dioxane soluble polyimide (BTMI-5) of the formula:

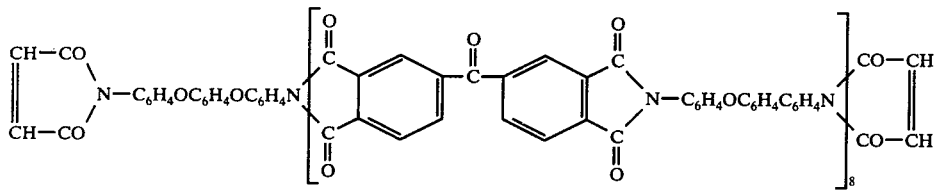

EXAMPLE 14

Example 13 is repeated using procedure of Example 12 (with sodium acetate). Gelation occurs in 1 hour.

EXAMPLE 15

Example 1 is repeated using 134 grams of the bis-maleimide, 136 grams of furan, 4 grams of disodium maleate and 1 liter of DMAC. The viscosity increases similarly to extent or Example 1. However, when 102 grams of furan are eliminated, the mixture is allowed to cool to room temperature and precipitated in either methanol or water. The precipitate is removed by filtration and dried. The product is fusible when heated in excess of 130° C. When admixed with Bronsted acid salts alone or in the presence of an aprotic solvent activator, a convertible composition is obtained which cures readily at temperatures of 160° C. or higher.

What is claimed is:

1. A process of increasing the molecular weight of a bis-maleimide of the formula:

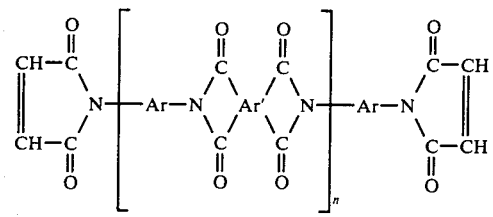

wherein
Ar is a divalent aromatic organic radical,
Ar' is a tetravalent aromatic organic radical, the four carbonyl groups being attached directly to separate carbon atoms and each pair of carbonyl groups being attached to adjacent carbon atoms and in the Ar' radical, and
$n$ is 0 or a positive integer of 1 to 20,
comprising: reacting at a temperature in the range of about 5°–100° C. one mole of the bis-maleimide with from 1 to 2 moles of a cyclic diene of the formula:

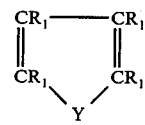

wherein
Y is —O—, —S—, or

and
each $R_1$ is hydrogen or an aliphatic hydrocarbon of 1 to 4 carbon atoms with the proviso that the sum of the $R_1$'s is no greater than 4 carbon atoms,
and thereafter thermally eliminating substantially all the cyclic diene at a temperature in the range of about 30°–120° C. to extend the bis-maleimide in molecular weight to at least a dimer of the bis-maleimide.

2. The process of claim 1 wherein at least 1 mole of cyclic diene is used per mole of bis-maleimide.

3. The process of claim 2 wherein the molecular weight is increased to a point before gelation occurs.

4. The process of claim 2 wherein the molecular weight is increased to an infusible state.

5. The process of claim 2 wherein the reaction is carried out in an aprotic solvent having a dielectric constant in the range of 35 to 45.

6. The process of claim 2 wherein the reaction is conducted in the presence of a catalytic amount of an alkali metal salt of a Bronsted acid, said alkali metal salt of a Bronsted acid selected from the group consisting of an alkali metal salt of an organic Bronsted acid having a $pk_a$ in the range of about 4 to 6, an alkali metal cyanide and an alkali metal carbonate.

7. The process of claim 6 wherein the reaction is carried out in an aprotic solvent having a dielectric constant in the range of 35 to 45.

8. The process of claim 7 wherein the solution of the bis-maleimide of increased molecular weight is treated with a liquid which is a non-solvent for the bis-maleimide to precipitate a solid product, and the solid product is isolated.

9. The process of claim 1 wherein $n$ is 0.

10. The process of claim 1 wherein $n$ is 1 to 20.

11. The process of claim 1 wherein each $R_1$ is hydrogen.

12. The process of claim 1 wherein Y is —O—.

13. The process of claim 1 wherein each $R_1$ is hydrogen and Y is —O—.

14. The process of claim 13 wherein the bis-maleimide has the formula:

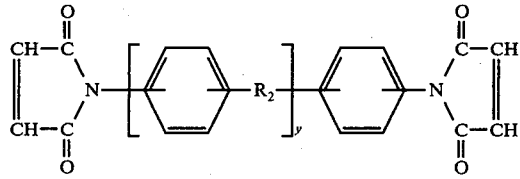

15. The process of claim 13 wherein the bis-maleimide has the formula:

wherein
$R_2$ is —CH$_2$—, —O—, or —SO$_2$— and
$y$ is a positive integer of 1 to 3.

* * * * *